Aug. 16, 1949.     J. T. WEBBER     2,479,531
POSITION INDICATING SYSTEM
Filed Jan. 24, 1945     2 Sheets-Sheet 1
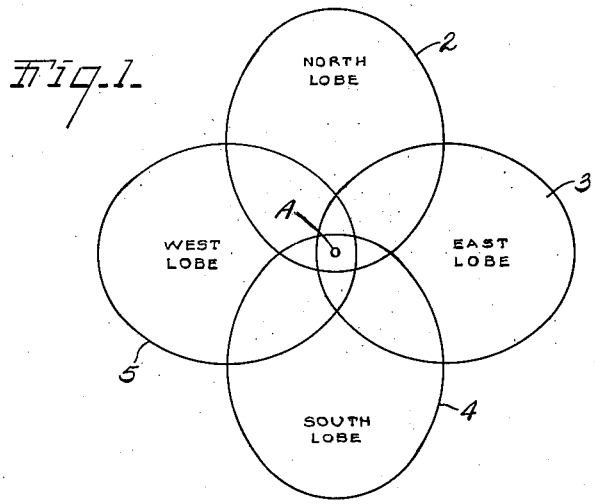
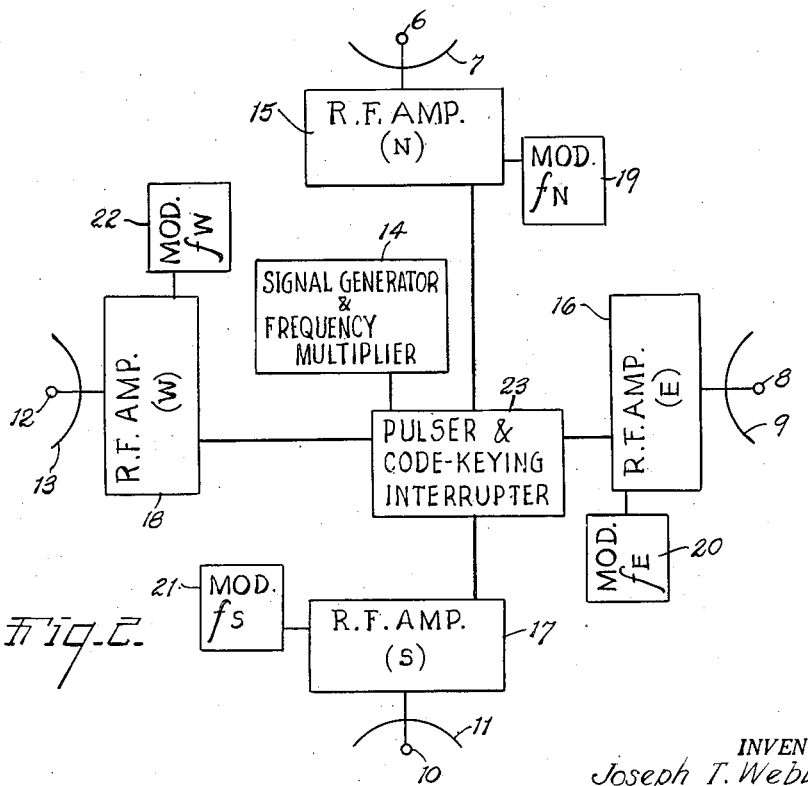
INVENTOR.
Joseph T. Webber
BY
Earl D. Chappell
ATTORNEYS.

Aug. 16, 1949.　　　　　J. T. WEBBER　　　　　2,479,531
POSITION INDICATING SYSTEM
Filed Jan. 24, 1945　　　　　　　　　　　　　　　　2 Sheets-Sheet 2
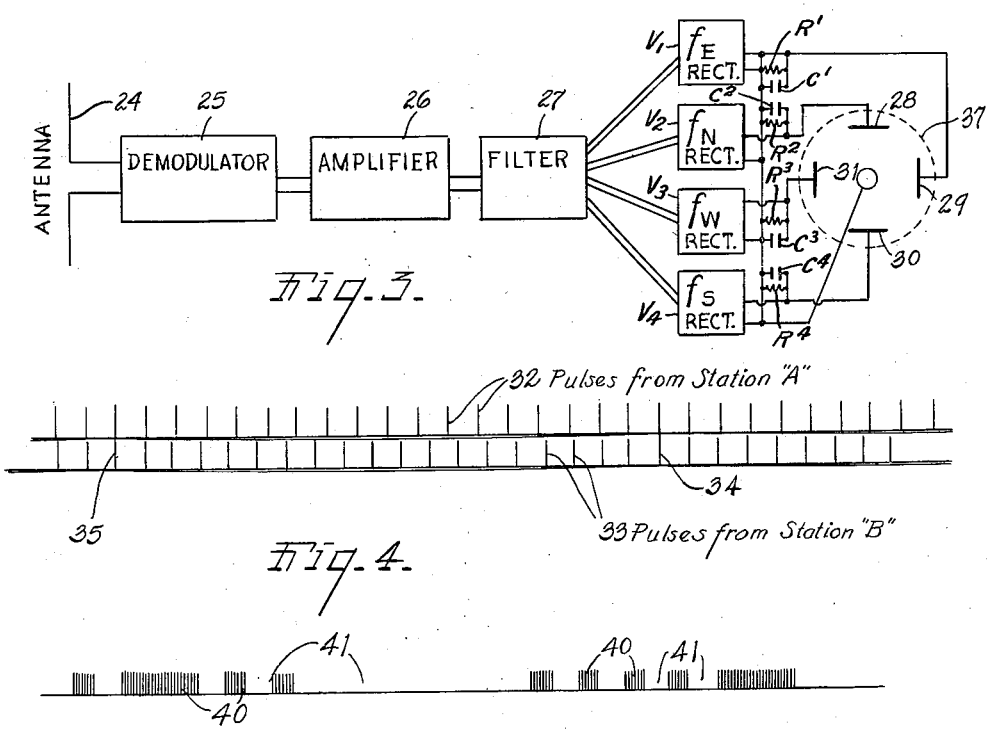
Fig. 3.
32 Pulses from Station "A"
33 Pulses from Station "B"
Fig. 4.
Fig. 5.
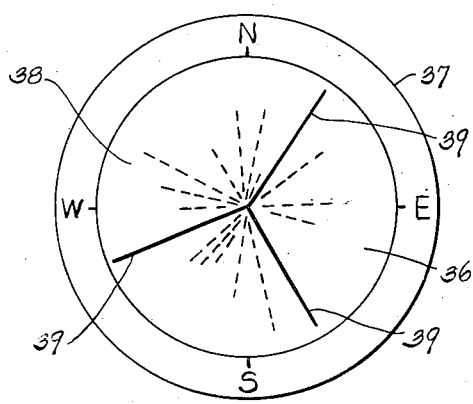
Fig. 6.
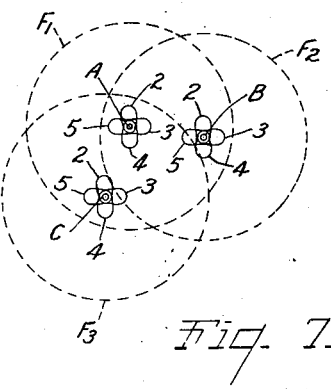
Fig. 7.
INVENTOR.
Joseph T. Webber
BY
Earl F. Chappell
ATTORNEYS.

Patented Aug. 16, 1949

2,479,531

UNITED STATES PATENT OFFICE 2,479,531

POSITION INDICATING SYSTEM

Joseph T. Webber, Galesburg, Mich., assignor to Editors and Engineers Limited, Los Angeles, Calif., a corporation of California Application January 24, 1945, Serial No. 574,415

18 Claims. (Cl. 343—112)

This invention relates to improvements in a position indicating system. It pertains more particularly to a system for use in navigation to indicate the position of both air and water craft.

Because the problems of water navigation and air navigation are parallel or identical, references made herein to one form of navigation will be understood to apply to the other form of navigation in its scope of usefulness.

Contact flying identifies a familiar terrain to the eye of the pilot, thus giving position information. Celestial navigation, at the hands of trained personnel, is quite accurate but very complicated besides requiring that celestial bodies be visible. Radio bearings have come into common use because of the accuracy, simplicity, and dependability of these systems. This invention is a radio system having advantages over existing systems.

Radio direction finders for providing direction information for craft exist in two fundamental forms. One of these uses some sort of directionally responsive antenna system aboard the craft and by means of which any known land station may be tuned in and a bearing taken. The other form uses a non-directive antenna system aboard the craft to receive direction-significant signals from a particular kind of transmitter at the ground station. This invention is of the latter type and further reference herein to direction finders refers to this type.

One system in common use employs ground station transmitters projecting dual beams (the A-N beams), to define a stationary line or zone represented by equal blending of two beams, which line or zone is used to provide a fixed course to the transmitting station. A network over the country of these course beams provides guidance between important positions, ordinarily large cities at which important airports are located. Where a fixed route is established and defined by a succession of these beams, reasonably good guidance is obtained. The method has two serious disadvantages. First, it provides definite information only regarding whether the receiving craft is on the beam or to the right of it or to the left of it, but not good information unless the craft is on, or nearly on, the beam. Second, it provides no information regarding the distance from the transmitter that the receiver is operating, unless and until a second beam emanating from a different station be intersected and separately tuned in. The A-N beam is thus a path indicator but not a position indicator.

Omni-directional systems have been devised, the purpose of which is to provide direction significant signals in all directions from a transmitter, to provide a higher degree of utility than is provided by the dual-system described above. One such system employs a rotating cardioid-shaped field pattern in conjunction with a starting signal, given as the minimum response point of the cardioid passes true north so that at the receiver a bearing may be determined by noting the elapsed time between the starting signal and the passing of the minimum response point at the receiver. Another system uses a similar cardioid pattern but rotates it much more rapidly, depending upon a timing mechanism in the receiver to rotate the stream of a cathode-ray tube in synchronism with the rotation of the transmitted pattern, so that a U-shaped inward deflection on the tube resulting from the passing of the minimum-response point of the cardioid, occurs at an angle corresponding to the direction of the transmitter from the receiver. This invention relates to omni-directional systems and their use in combination and is an improvement upon existing systems.

It is common to employ different ground stations operating at different carrier frequencies in order to prevent interference each by the others. Thus it is necessary to tune in each of the stations separately, taking an individual bearing on each. A direction finder does not become a position indicator unless more than one bearing is taken; so to determine a position it is necessary to tune in a succession of different stations and to remember or to record the bearing of each to compare with the others.

The main objects of this invention are:

First, to make possible the viewing, apparently simultaneously, the direction indications from several stations, thus to provide position information rather than only direction information.

Second, to provide position information and direction information without the necessity for tuning in different stations on different frequencies.

Third, to provide accurate direction and position information to a craft in a way that it may be readily understood without a high degree of specialized training.

Fourth, to provide omni-directional intelligence from a transmitter to a receiver without the need for timing arrangements on either transmitter or receiver.

Fifth, to provide a sharp and thus a more accurate indication of the direction of a station, appearing as a radial trace on the viewing screen of a cathode ray tube rather than appearing as a relatively broader indication obtained by the rotating cardioid system.

Sixth, to provide a network of interrelated direction-bearing stations with overlapping fields operated at the same signal frequency or within a single narrow frequency band, to provide position significant information to a suitable receiver operated anywhere within these overlapping fields.

Seventh, to limit the frequency required by a number of such direction-bearing transmitters, to the frequency band required by a single one, in order to avoid the unnecessary use of a large portion of frequency spectrum which is required for other services.

Objects relating to details and economies of the invention will appear from the description to follow. The invention is defined in the claims.

Preferred embodiments of the invention are illustrated in the accompanying drawings, in which:

Fig. 1 is a diagrammatic representation of a radio transmitting station and of a desired direction-significant transmitter field pattern in the form of a four leaf clover radiated therefrom.

Fig. 2 is a diagrammatic representation of a suitable transmitter for the production of a field of direction-significant signals in conjunction with a suitable multiple-antenna system, the shape of the field pattern produced thereby being similar to that shown in Fig. 1.

Fig. 3 is a diagrammatic showing of a simple and suitable receiver for receiving transmission from the transmitter of Fig. 2 or to receive transmission from a network of such transmitters.

Fig. 4 diagrammatically illustrates two series of succession of pulses that are transmitted from two transmitters during the same interval of time, the recurrence pulse rate of one transmitter being slightly different from that of the other.

Fig. 5 illustrates a series of spaced blocks of pulses in coded sequence for identifying a particular transmitter station.

Fig. 6 is a front view of a cathode ray viewing screen, having indicated thereon the true direction of each of three transmitting stations.

Fig. 7 is a diagrammatic representation of a plurality of radio transmitting stations each similar to the station shown in Fig. 1 and also showing in dotted outline the fields of the different stations overlapping each other.

Referring to Fig. 1 of the drawing, the reference character A designates a radio transmitting station provided with a transmitter, such as shown in Fig. 2, adapted to radiate therefrom a field pattern in the shape of a four-leaf clover, comprising a north lobe 2, an east lobe 3, a south lobe 4 and a west lobe 5. The line defining each lobe represents an equi-potential path around the central transmitter, with respect to transmission carrying the modulation which is characteristic of that direction. These lobes do not represent identical signals, and so must not be confused with an ordinary clover-shaped field pattern. Each lobe represents transmission principally in a certain direction and is differently modulated than the other three lobes. The signal of the lobe 2 which is radiated principally toward the north is modulated at one frequency; the signal of lobe 3 pointing east, at another frequency; the signal of lobe 4 pointing south at another; and the signal 5 pointed west, at still another. Now if a receiver is east of the transmitter, the "east" signal will be strong, the west signal will be weak or practically non-existant, and the "north" and the "south" signals will be equal but very much weaker than the east signal. But if the receiver is northeast of the transmitter, the "north" and "east" signals will be equal and fairly strong, while the "south" and "west" signals will be equal and relatively weak. It is seen that the character of the received combined signal, is indicative of the direction of the transmitter from the receiver.

It is also seen that even without any special attention being given to the precise shape of the lobe patterns, if the four patterns are merely alike, a high degree of accuracy can be had in determining direction at eight points of the compass; the four cardinal directions, and the four (45°) interval directions. Now the pattern can be controlled by presently known means, such as that which commonly involves the number of radiating and reflecting elements used in each of the four directional radiators, and the physical placement of these radiating and reflecting elements. The four patterns may then be correctly shaped to provide signal ratios at other compass points between the eight mentioned above, such that a high degree of accuracy may be had at any point in the field of the transmitter.

The radio transmitting station A constitutes one of a network of a considerable number of radio transmitting stations two others of which are shown at B and C in Fig. 7. Each of these transmitting stations is similar to that of each of the others except for a slightly different recurrence pulse rate hereinafter described. Each station radiates a field pattern similar to that of station A, and the field pattern of one station overlaps those of adjacent stations as shown by the dotted lines $F_1$, $F_2$, and $F_3$ encircling the stations A, B and C respectively. The dotted line encircling each station represents the extent of the field of its station, the defining cause of limitation of each field being the obstruction of the earth due to its curvature between the station and a receiver. It is to be understood that such a field is not necessarily an exact circle, as any irregularity in the earth's surface deviating from spherical, within the field will shorten or extend the field limit in the direction of that irregularity. And as hereinafter described the field is larger if measured at an altitude than if measured at the surface, and the fields are positioned closely enough together to provide useful overlapping even when flying at low altitudes.

A suitable transmitter disposed at each of the radio sending stations A, B, C and each of the other stations, not shown, for producing a field pattern, such as shown in Fig. 1, may be of the type shown, for example, in Fig. 2. The antenna system of this transmitter comprises a north-directed antenna 6 with reflector 7 for producing the north field lobe 2; an east-directed antenna 8 with reflector 9 for producing the east field lobe 3; a south-directed antenna 10 with reflector 11 for producing south field lobe 4; and a west-directed antenna 12 with reflector 13 for producing west field lobe 5. In this case, the four antennae are shown with curved reflectors to produce the desired lobe shapes but it is understood other arrangements for producing directional transmission may be used instead. For convenience and simplicity, a single signal generator and frequency multiplier 14 is used to drive the four separate R. F. amplifiers 15, 16, 17 and 18 connected respectively to the antennae 6, 8, 10 and 12. As indicated at 19, 20, 21 and 22 each signal for each of the four directions is separately modulated and each is modulated differently from the others. All four of the directional signals radiated by the antennae 6, 8, 10 and 12 and directed by their respective reflectors 7, 9, 11 and 13, are interrupted simultaneously by the pulse and code keying interrupter 23 which act to switch off and on the signal fed from the signal generator and frequency multiplier 14 to each of the four R. F. amplifiers 15, 16, 17 and 18. Of course, it is apparent to one skilled in the art that the function of interrupting the signal may be had by applying the switching action at other circuit points than the one shown, as for example within the signal generator, or within the frequency multiplier or within the R. F. amplifier, or between each R. F. amplifier and its antenna; and it is to be understood that the point of application chosen to be shown in Fig. 2, that is, between the signal generator and frequency multiplier 14 and the R. F. amplifiers 15, 16, 17 and 18, is only for convenience and is not a limiting specification. It is also to be understood that the type of interrupter to be employed may be electro-mechanical such as a driven commutator or a relay; or it may be electronic, such as by means of thermionic tubes.

The switching provided by the pulse keying interrupts the signal fed from the signal generator and frequency multiplier 14 to each of the R. F. amplifiers 15, 16, 17, and 18 to pass only brief spaced pulses of R. F. energy to actuate the amplifiers. The pulses 32 in Fig. 4 represent spaced pulses of R. F. energy transmitted by one station A, and the pulses 33 in Fig. 4 represent spaced pulses of R. F. energy transmitted by another station B.

The switching provided by the code keying interrupter interrupts the sequence of pulses (such as pulses 32 in Fig. 4) to form a train of segments of pulsed R. F. energy according to any desired coded sequence such as the one shown in Fig. 5, ordinarily to produce a source-identifying signal. A suitable sequence would be to transmit identifying symbols followed by a relatively long steady uncoded signal, and this or any desired sequence may be made repetitive by the use of a driven commutator.

The segments of R. F. energy which are thus valved by the code keying interrupter are themselves broken into a sequence of spaced pulses by the valving of the pulse keying interrupter, and each of these pulses of R. F. energy as supplied by each of the R. F. amplifiers to its directional antenna contains a modulation component. Each of the four radiated signals is modulated at a frequency different from the other three, each of the four modulation frequencies signifying a direction of signal transmission. All of the transmitters stationed within the range of a single receiver and intended to operate that receiver without the need for a receiver tuning adjustment operate on substantially the same carrier frequency and employ substantially the same modulation frequencies; each of these modulation frequencies signifying the same direction of transmission in each case.

In the case shown, it is necessary for the duration of each pulse to be great enough that a sufficient number of cycles of the modulating frequency are contained in the pulse for that modulating frequency to be "tuned" by the selector filter in the associated receiver by means to be described later. For example, it has been found satisfactory to employ a carrier frequency of 150 megacycles, modulating frequencies $f_n$, $f_e$, $f_s$ and $f_w$ of 3.5 megacycles, 5.5 megacycles, 4.2 megacycles and 6.3 megacycles, respectively, and to employ a pulse length of 50 microseconds. It has been found satisfactory to use a pulse repetition rate of twenty to thirty per second, a different repetition rate being employed by each of the several stations operating in joint range of a receiver anywhere in that area.

For intercepting the signals sent out by the transmitter shown in Fig. 2 and for interpreting the signals thus received in terms of direction and position intelligence, any suitable craft-borne radio receiving equipment may be provided such for example as that shown in Fig. 3. This radio receiving equipment is arranged to receive, from a transmitter such as is shown in Fig. 2, a direction significant signal consisting of four simultaneous transmissions from the four transmitter radiators, the four transmissions being at a single signal frequency but being differently modulated, the four transmissions thus being simultaneously received being different one from another in amplitude, this difference in amplitude being dependent upon the four-lobe field pattern of the transmitter as shown in Fig. 1, and being dependent upon the direction from the transmitter of the receiver. The receiving equipment is arranged to demodulate the received transmissions, to reveal the four modulation signals which vary from one another in intensity according to the variations in strength of the four respective transmissions from which the modulation signals were demodulated, so that the relative intensities of the four modulation signals in the receiver are a function of, and are indicative of the direction of the receiver from the transmitter. As heretofore described, the intensity of each of the modulated frequencies received by the receiver depends on the direction of the receiver from a transmitting station. The four combined modulation signals are then amplified to increase the sensitivity of the receiving equipment, but no alteration in the combined modulation signals is sought in the amplifier except amplification, so that the relative strengths of the four modulation signals remain in the amplified output of the amplifier. In the output circuit of the amplifier is a selective filter having four secondary circuits each tuned to one of the four modulation signal frequencies, so that each of these secondary circuits contains its associated modulation signal to the virtual exclusion of the other three modulation signals, and each of the four modulation signals has a relative intensity according to its intensity before entering the selective filter, which intensity depends upon the direction of the receiver from a transmitting station, so that the relative intensities of the separated modulation signals are indicative of the direction of the receiver from the transmitter.

The modulation signal from each of the four secondaries of the selective filter is fed into a rectifier $v$ which is then connected to a resistive load R. If the modulation signal to that rectifier were continuously applied, a D. C. voltage would be caused to exist across the resistor, and the value of the voltage would depend upon the strength of the modulation signal applied. If the signal were abruptly applied, the voltage across the resistor would instantly rise to its steady-rate value, and if the signal were abruptly terminated, the voltage would instantly fall to zero.

Connected across each of the four resistors is provided a capacitor which has for its purpose the preventing of both the abrupt rise and the abrupt fall of the rectified voltage, for reasons which will appear when the action of the cathode ray tube is explained. When the modulation signal is suddenly applied to the rectifier, the capacitor, acting as a reservoir, requires time to be charged and absorbs energy while it is charging, which causes the rise in voltage to be gradual rather than abrupt; and when the applied modulation signal is abruptly terminated, the capacitor requires time to be discharged while the energy of its charge is being absorbed by the resistor, so that the voltage across the resistor and the capacitor falls gradually rather than abruptly. The values of the resistor and capacitor are determined for whatever time factor is desired for the rise and fall of the voltage, and for whatever strengths of modulation signal are to be had, and according to the effective resistance of whatever rectifier is employed. It is desired to provide the same charging rate and discharging rate for $C_1$, $C_2$, $C_3$ and $C_4$, and to accomplish this most conveniently rectifiers $V_1$, $V_2$, $V_3$ and $V_4$ are alike, capacitors $C_1$, $C_2$, $C_3$ and $C_4$ are alike, and resistors $R_1$, $R_2$, $R_3$ and $R_4$ are alike.

The strengths of the voltages across the respective resistors at any instant are dependent upon the strengths of the four applied modulation signals, and thus the relationship between these voltages is indicative of the direction of the receiver from the transmitter.

Each of the resistors $R_1$, $R_2$, $R_3$, and $R_4$ has a common terminal and this is connected to the cathode of the electron gun of a cathode ray tube, such connection of resistors to an electron gun being old as shown in patent to Linsell No. 2,063,610. One terminal of each of the capacitors is connected to one of the electrostatic deflector plates of that cathode ray tube, the capacitor which is energized by the rectified current from the modulation signal of the frequency representing "north" being connected to the plate opposite the one connected to the capacitor which is energized by the rectified current from the modulation signal of the frequency representing "south," and the capacitor which is energized by the rectified current from the modulation signal of the frequency representing "east" being connected to the plate opposite the one connected to the capacitor which is energized by the rectified current from the modulation signal of the frequency representing "west."

The operation of the transmitter of station A to a single receiver is above described. However, it appears that if a second transmitter such as at station B were placed in operation in the same area, operating at the same carrier frequency and transmitting the same kind of direction intelligence, each transmitter might be expected to interfere with the other with the result that no accurate direction indication could be had from either. Of course it would be possible to operate each transmitter on a separate frequency to avoid this interference but this would involve the need for repeatedly tuning the receiver and the need for taking a succession of bearings, and one of the purposes of this invention is to eliminate these needs.

Reference has been made to a pulser 23 of the transmitter which periodically and simultaneously interrupts transmission of the signals in each of the four directions. This pulser is of a type adapted to transmit a succession of relatively brief, relatively widely spaced pulses of direction-significant signals. The purpose of the signal during a pulse is of course to convey direction intelligence to the receiver so that a trace may be had on the viewing screen of the receiver cathode ray tube indicative of the direction of the transmitter from the receiver. The purpose of the silent interval following each pulse is to permit the receiver to receive and record by another trace, direction significant signals from another station. If each transmitter emits during the silent interval of the other, and if their recurrence rates are sufficiently high such as approximately fifteen pulses per second, the persistence of vision of the human eye alone or in combination with the persistence of the cathode ray viewing screen, will give the illusion to the eye of each trace remaining continuously on the screen.

It is possible, in the manner above described, to link together a number of transmitters one at each of the sending stations in a way that they will pulse in sequences, none ever pulsing at a time another is pulsing. This linking of stations is particularly practical if the stations are few and closely together, as for a landing indicator for an air port; but for an omni-directional system having many transmitters widely spaced, this linking might be difficult, expensive and hazardous. The failure of a linking circuit might mean that all of the transmitters in an area would be out of commission, or that false indications might be had. A further embodiment of the invention eliminates the need for this linking or synchronizing.

This further embodiment consists in the provision of two or any considerable number of potentially interfering transmitter stations such as A, B and C each having a pulser 23 operating similarly to that of Fig. 2, each pulser having a slightly different recurrence pulse rate from that of the pulser of every other station, and each with a transmitting pulse length equal to one or other very small percent of the silent interval between successive pulses. If two such stations are considered, each having a pulse length equal to one percent of the silent interval, then two percent of the pulses from each station will be interfered with by the pulses from the other station, to a greater or lesser degree, and will cause false indications. If three stations are considered, then approximately four percent of the pulses from each will suffer "interference." Four stations will cause about six percent to interfere. It will thus be seen that a relatively low percentage of the pulses will suffer any interference, when the recurrence pulse rate of each station is slightly different from that of each of the other stations, and when each station transmits pulses each of a length that is very brief as compared to the silent interval between two successive pulses.

Fig. 4 illustrates two series of pulses, sent out in the same interval of time by two stations as stations A and B. The pulses 32 from station A have a slightly less recurrence rate than the recurrence rate of the pulses 33 from station B. In each series the vertical lines representing pulses are relatively narrow as compared to the distance between said lines, to approximately indicate, respectively, the very brief interval of a pulse as compared to a relatively long silent interval between successive pulses. It is seen that interference between the pulses 32 from station A and the pulses 33 from station B occurs only at the places where the vertical pulse line extended in one series coincides with a vertical pulse line in the other series, as would occur at 34 and 35; and it is seen that this interference represents only a very small portion of the time.

Referring to Fig. 6 for the indications traced on the viewing screen 36 of the cathode ray tube 37 as a result of the interference above described, indications represented by dotted lines 38 resulting from interferences are weak and are not noticeably objectionable because they are relatively few and because they occur at random and do not recur coincidentally. Meanwhile the true directions of the craft borne receiver from the different stations are traced on the screen by steady clear, well defined lines represented by radii 39 shown in solid black. These indications of the true directions of the different stations are relatively strong and steady because they are much more frequent than the interference indications and because they recur coincidentally. The combination of ocular persistence in the eye of the observer and the persistence obtained on the viewing screen of the cathode ray tube, gives the illusion of continuity to the traces representing the true directions 39 of the different stations, while the weak, random traces 38 resulting from interference do not have the illusion of continuity. Recurrence frequencies are chosen to give continuity to the one but not to the other. Each of the three radii 39 represents the direction of a different transmitter and the position from which these radii diverge represents the position of the receiver.

All of the transmitter signal frequencies are preferably of a high order, one reason for which is to take advantage of the well known horizon limitation existing with such high frequency transmission. Direction-bearing transmitters would be expected to be placed closely enough that from two to four or more stations could be received from any point in a direction significant area, which area might be a continent, or any chosen part of it. A transmitter located high above the surrounding country-side would be received farther away than one not so well placed, and any transmitter will be received farther away by a high flying craft than by one flying at a lower level. Transmitters placed at intervals of, say, 100 miles in each direction should provide fields that overlap satisfactorily.

A further feature of the invention is an identifying method by means of which the user, at the receiver, may readily identify and associate with its known transmitter, any and all of the direction indications appearing on the cathode ray tube. By this identifying method, if a transmitting station is indicated on the cathode ray tube as being in a certain direction, this particular station may be identified with certainty, which information is particularly advantageous where there is considerable network of such transmitting stations extending over a large area, in order that the user at the receiver may know his exact position relative to this network and in the area thereof. This information, for instance of identifying a particular transmitter station, is effected by a steady appearance of a true direction line on the screen followed by its disappearance and so on in sequence, the time interval lengths of the appearances and disappearance being in a coded sequence. Each transmitter station has its own peculiar coded sequence. Referring to Fig. 5, the blocks 40 of vertical lines indicate time intervals of certain coded lengths during which the pulser 23 of a station is pulsing with such rapidity that during each of said intervals, that persistence of vision causes the true direction line 39 of this station to appear steady on the screen 36. The blank spaces 41 between the blocks 40 represent time intervals of certain coded lengths substantially greater than the persistence of vision during which the pulser 23 is not pulsing and therefore the true direction line 39 of this station does not appear on the screen during these intervals. The keying of this coded sequence may be automatically effected as by electro-mechanical means. A key code interrupter is conventionally shown with the pulser 23 in Fig. 2. The coded sequence may represent a letter or number or sequence of them. In Fig. 5 "L 4" is represented in code. A specification is that the keying frequency be made slower than the persistence of vision in combination with trace persistence at the cathode ray tube, as contrasted with the recurrence rate specification for the pulses which is faster than the persistence of vision. The effect viewed by the user is that the apparently steady trace indicating a true direction 39 of a transmitter station being interrupted according to an identifying sequence.

The portion of this invention which specifies the use of pulses is likewise applicable to methods of creating a direction-significant field other than the stationary clover leaf pattern above described. In the rotating cardioid, for example, a pulse would represent the time required for the cardioid to make one or more directional significant revolutions, and the beginning of the pulse might well be used for the timing starting signal. Considering that each pulse from each of a plurality of transmitter stations represents the transmission of complete direction intelligence as to all four compass directions, from the transmitter to the receiver, and further considering that each pulse of all or substantially all the pulses from each of these plurality of transmitter stations occurs during the silent intervals between the pulses of each of the other stations, it is seen how this portion of the invention is applicable regardless of the method employed to create the direction significant field by the transmitter.

Embodiments of the invention which incorporate the principles of the invention in a highly desirable manner have been illustrated and described, though I am aware that other embodiments within the intent of the invention will suggest themselves to those skilled in the art. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. A position indicating system comprising a plurality of spaced radio transmitting stations, each station having a transmitter, the field of the transmitter of one station overlapping the field of the transmitter of an adjacent station, each transmitter adapted to transmit direction-significant signals, all of said transmitters adapted to transmit said signals on the same wave frequencies, and a pulser for each transmitter timed to interrupt transmission therefrom to transmit a succession of relatively brief, widely spaced pulses of direction-significant signals, each of said pulses including a plurality of transmitted waves, the pulser of each transmitter having a slightly different recurrence pulse rate from the recurrence pulse rate of the pulser of each of the other transmitters, whereby substantially all of the relatively brief pulses of each transmitter occur during the relatively long silent intervals between successive pulses of each of the other transmitters, the silent interval between two successive pulses of said succession of pulses from each transmitter being less than the interval of persistence of vision, whereby the traces of a true direction on the viewing screen of a cathode ray tube associated with a receiver tuned to receive said transmission appears steady and continuous.

2. A position indicating system comprising a plurality of spaced radio transmitting stations, each station having a transmitter, the field of the transmitter of one station overlapping the field of the transmitter of an adjacent station, each transmitter adapted to transmit direction-significant signals, all of said transmitters adapted to transmit said signals on the same wave frequencies, and a pulser for each transmitter timed to interrupt transmission therefrom to transmit a succession of relatively brief, widely spaced pulses of direction-significant signals, each of said pulses including a plurality of transmitted waves, the pulser of each transmitter having a slightly different recurrence pulse rate from the recurrence pulse rate of the pulser of each of the other transmitters, whereby substantially all of the relatively brief pulses of transmission of each transmitter occur during the relatively long silent intervals between successive pulses of each of the other transmitters.

3. A position indicating system comprising a plurality of spaced radio transmitting stations, each station having a transmitter, the field of the transmitter of one station overlapping the field of the transmitter of an adjacent station, each transmitter adapted to transmit direction-significant signals, all of said transmitters adapted to transmit said signals on the same wave frequencies, and a pulser for each transmitter timed for interrupting transmission therefrom to transmit a succession of relatively brief, relatively widely spaced pulses of direction-significant signals, each of said pulses including a plurality of transmitted waves, the pulser of each transmitter also being timed to interrupt transmission therefrom to transmit the relatively brief pulses thereof during the relatively long silent intervals between the pulses transmitted by each of the other transmitters, the silent interval between two successive pulses of a succession of pulses from each transmitter being less than the interval of persistence of vision.

4. In a position indicating system, a plurality of spaced radio transmitting stations, each station having a transmitter, the field of the transmitter of one station overlapping the field of the transmitter of an adjacent station, each transmitter adapted to transmit direction-significant signals, and a pulser for each transmitter timed for interrupting transmission to transmit a succession of relatively brief, relatively widely spaced pulses of direction-significant signals, each of said pulses including a plurality of transmitted waves, the pulser of each transmitter also timed to interrupt transmission to transmit a relatively brief pulse thereof during the relatively long silent interval between successive pulses of each of the other transmitters, the silent interval between two successive pulses of said succession of pulses from each transmitter being less than the interval of persistence of vision.

5. A position indicating system comprising a plurality of spaced radio transmitting stations, each station having a transmitter, the field of the transmitter of one station overlapping the field of the transmitter of an adjacent station, each transmitter adapted to transmit direction-significant signals, all of said transmitters adapted to transmit said signals on the same wave frequencies, and a pulser for each transmitter timed to interrupt transmission therefrom to transmit a succession of relatively brief, widely spaced pulses of direction-significant signals, each of said pulses including a plurality of transmitted waves, the pulser of each transmitter having a slightly different recurrence pulse rate from the recurrence pulse rate of the pulser of each of the other transmitters, whereby substantially all of the relatively brief pulses of each transmitter occur during the relatively long silent intervals between successive pulses of each of the other transmitters, the silent interval between two successive pulses of said succession of pulses from each transmitter being less than the interval of persistence of vision, whereby the traces of a true direction on the viewing screen of a cathode ray tube associated with a receiver tuned to receive said transmission appears steady and continuous, and a code key interrupter associated with each pulser of each transmitter timed to interrupt transmission of said succession of pulses into spaced blocks of pulses, the blocks of pulses and the silent intervals therebetween being in a particular coded sequence as to number and lengths for each transmitter, the silent interval between two successive blocks of pulses being greater than the interval between two successive pulses of a block and greater than the interval of persistence of vision, whereby said steady and continuous appearance of a true direction on said viewing screen is interrupted by certain predetermined intervals of disappearances, all in said coded sequence.

6. A position indicating system comprising a plurality of spaced radio transmitting stations, each station having a transmitter, the field of the transmitter of one station overlapping the field of the transmitter of an adjacent station, each transmitter adapted to transmit direction-significant signals, all of said transmitters adapted to transmit said signals on the same wave frequencies, a pulser for each transmitter timed for interrupting transmission therefrom to transmit a succession of relatively brief, relatively widely spaced pulses of direction-significant signals, each of said pulses including a plurality of transmitted waves, the pulser of each transmitter also being timed to interrupt transmission therefrom to transmit the relatively brief pulses thereof during the relatively long silent intervals between the pulses transmitted by each of the other transmitters, the silent interval between two successive pulses of a succession of pulses from each transmitter being less than the interval of persistence of vision, and a code key interrupter associated with said pulser timed to interrupt transmission of said succession of pulses into spaced blocks of pulses, the silent interval between two successive blocks of pulses being greater than the interval between two successive pulses of a block and greater than the interval of persistence of vision, said blocks of pulses and silent intervals therebetween being in a particular coded sequence as to number and lengths for each transmitter.

7. In a position indicating system, a plurality of spaced radio transmitting stations, each station having a transmitter, the field of the transmitter of one station overlapping the field of the transmitter of an adjacent station, each transmitter adapted to transmit direction-significant signals, a pulser for each transmitter timed for interrupting transmission to transmit a succession of relatively brief, relatively widely spaced pulses of direction-significant signals, each of said pulses including a plurality of transmitted waves, the pulser of each transmitter also timed to interrupt transmission to transmit relatively brief pulses thereof during the relatively long silent interval between successive pulses of each of the other transmitters, the silent interval between two successive pulses of said succession of pulses from each transmitter being less than the interval of persistence of vision, and a code key interrupter associated with said pulser timed to interrupt transmission of said succession of pulses into spaced blocks of pulses, the silent interval between two successive blocks of pulses being greater than the interval between two successive pulses of a block and greater than the interval of persistence of vision, said blocks of pulses and silent intervals therebetween being in a particular coded sequence as to number and lengths for each transmitter.

8. In a position indicating system, a radio transmitter disposed to transmit generally horizontally and principally in each of four directions extending generally horizontally radially outwardly from said transmitter to produce a direction-significant field pattern in the form of a four leaf clover, said transmitter adapted to transmit with the same carrier frequency in each of said four directions, said transmitter adapted to modulate said carrier frequency to a different modulated frequency in each of said four directions, a pulser to simultaneously and periodically interrupt transmission in all said four directions, to transmit a succession of spaced pulses, each of said pulses including a plurality of transmitted waves, the recurrence pulse rate of said pulser being substantially less than the carrier frequency and any of the modulated frequencies, whereby a receiver tuned to receive said transmission may filter out the carrier frequency and each of the different modulated frequencies, and permit only the frequency of the pulser reaching the four deflector plates of the cathode ray tube associated with the receiver so that the voltages impressed upon said deflector plates are all simultaneously at their maximum and simultaneously at their minimum whereby only a single clear well defined direction line is traced on the viewing screen of the cathode ray tube.

9. In a position indicating system, a radio transmitter disposed to transmit generally horizontally and principally in each of several directions to produce a direction-significant field pattern in the form of overlapping lobes projecting generally horizontally radially outwardly from a common center, said transmitter adapted to transmit with a different wave frequency in each of said several directions, and pulsing means timed to simultaneously and periodically interrupt transmission in all said several directions to transmit a succession of spaced pulses, a pulse in each direction including a plurality of transmitted waves.

10. In a position indicating system, a radio transmitter disposed to transmit generally horizontally and principally in each of several directions to produce a direction-significant field pattern in the form of overlapping lobes projecting generally horizontally radially outwardly from a common center, said transmitter adapted to transmit with a different wave frequency in each of said several directions, and a pulser timed to simultaneously and periodically interrupt transmission in all said several directions to transmit a succession of spaced pulses, a pulse in each direction including a plurality of transmitted waves, and the interval between two successive pulses in each direction being less than the interval of persistence of vision.

11. In a position indicating system, a radio transmitter disposed to transmit generally horizontally and principally in each of several directions to produce a direction-significant field pattern in the form of overlapping lobes projecting generally horizontally radially outwardly from a common center, said transmitter adapted to transmit with a different wave frequency in each of said several directions, a pulser timed to simultaneously and periodically interrupt transmission in all said several directions to transmit a succession of spaced pulses, a pulse in each direction including a plurality of transmitted waves, a receiver for receiving transmission from said transmitter, and a cathode ray tube associated with said receiver, said tube having a plurality of deflectors, each disposed to represent a different one of said several directions, said receiver including means for sorting the received transmission from each of said several directions into a separate channel, each leading to a particular deflector representing that direction, said receiver including means for filtering from all the channels all frequency transmissions but the pulse frequency.

12. A position indicating system including a plurality of spaced radio transmitters, each adapted to transmit principally in each of the four compass directions to produce direction-significant field patterns in the form of a four leaf clover, each transmitter adapted to transmit with the same carrier frequency in each of said four directions, each transmitter adapted to modulate said carrier frequency differently in each of said four directions with the modulated frequencies of all transmitters for the same direction being the same, and a pulser for each transmitter timed to simultaneously interrupt transmission in all four directions to simultaneously transmit a succession of relatively brief relatively widely spaced pulses in all said directions, a pulse in each direction including a plurality of transmitted waves, and the pulser of each transmitter being timed to transmit a pulse during the relatively long silent interval between successive pulses of each of the other transmitters.

13. A position indicating system including a plurality of spaced radio transmitters each adapted to transmit principally in each of several directions to produce a direction-significant field pattern in the form of overlapping lobes projecting radially outwardly from a common center, the field patterns of all the transmitters being of the same pattern shape, the field pattern of each transmitter overlapping the field pattern of one or more of the other transmitters, each transmitter adapted to transmit with a different frequency in each of said several directions, the frequencies of all the transmitters for the same direction being the same, and a pulser for each transmitter timed to simultaneously interrupt transmission therefrom in all said several directions to simultaneously transmit a succession of relatively brief, relatively widely spaced pulses in all said several directions, each pulse including a plurality of transmitted waves, the pulser of each transmitter being timed to transmit pulses during the relatively long silent intervals between successive pulses of each of the other transmitters.

14. A position indicating system including a plurality of spaced radio transmitters each adapted to transmit principally in each of several directions to produce a direction-significant field pattern in the form of overlapping lobes projecting radially outwardly from a common center, the field patterns of all the transmitters being of the same pattern shape, the field pattern of each transmitter overlapping the field pattern of one or more of the other transmitters, each transmitter adapted to transmit with a different frequency in each of said several directions, the frequencies of all the transmitters for the same direction being the same, and a pulser for each transmitter timed to simultaneously interrupt transmission therefrom in all said several directions to simultaneously transmit a succession of relatively brief, relatively widely spaced pulses in all said several directions, each pulse including a plurality of transmitted waves, the pulser of each transmitter having a slightly different recurrence pulse rate from that of the pulser of each of the other transmitters whereby substantially all of the transmission of each transmitter occurs during the relatively long silent intervals between successive pulses of each of the other transmitters.

15. A position indicating system including a plurality of spaced radio transmitters each adapted to transmit principally in each of several directions to produce a direction-significant field pattern in the form of overlapping lobes projecting radially outwardly from a common center, the field pattern of all the transmitters being of the same pattern shape, the field pattern of each transmitter overlapping the field pattern of one or more of the other transmitters, each transmitter adapted to transmit with a different frequency in each of said several directions, the frequencies of all the transmitters for the same direction being the same, and a pulser for each transmitter timed to simultaneously interrupt transmission therefrom in all said several directions to simultaneously transmit a succession of relatively brief, relatively widely spaced pulses in all said several directions, each pulse including a plurality of transmitted waves, the pulser of each transmitter having a slightly different recurrence pulse rate from that of the pulser of each of the other transmitters whereby substantially all of the transmission of each transmitter occurs during the relatively long silent intervals between successive pulses of each of the other transmitters, and the silent interval between two successive pulses from each transmitter being less than the interval of persistence of vision.

16. In a position indicating system, a radio transmitter disposed to transmit generally horizontally and principally in each of several directions to produce a direction-significant field pattern in the form of overlapping lobes projecting generally horizontally radially outwardly from a common center, said transmitter adapted to transmit with a different modulation characteristic in each of said several directions, a pulser timed to simultaneously and periodically interrupt transmission in all said several directions to transmit a succession of spaced pulses, a pulse in each direction including a plurality of transmitted waves, a receiver for receiving transmission from said transmitter, and a cathode ray tube associated with said receiver, said tube having a plurality of deflectors, each disposed to represent a different one of said several directions, said receiver including means for sorting the received transmission from each of said several directions into a separate channel, each leading to a particular deflector representing that direction, said receiver including means for filtering from all the channels all frequency transmissions but the pulse frequency.

17. In a position indicating system, a radio transmitter disposed to transmit generally horizontally and principally in each of several directions to produce a direction-significant field pattern in the form of overlapping lobes projecting generally horizontally radially outwardly from a common center, said transmitter adapted to transmit with a different modulation characteristic in each of said several directions, and a pulser timed to simultaneously and periodically interrupt transmission in all said several directions to transmit a succession of spaced pulses, a pulse in each direction including a plurality of transmitted waves, and the interval between two successive pulses in each direction being less than the interval of persistence of vision.

18. In a position indicating system, a radio transmitter disposed to transmit generally horizontally and principally in each of several directions to produce a direction-significant field pattern in the form of overlapping lobes projecting generally horizontally radially outwardly from a common center, said transmitter adapted to transmit with a different modulation characteristic in each of said several directions, and pulsing means timed to simultaneously and periodically interrupt transmission in all said several directions to transmit a succession of spaced pulses, a pulse in each direction including a plurality of transmitted waves.

JOSEPH T. WEBBER.

REFERENCES CITED

The following references are of record in the file of this patent:

UNITED STATES PATENTS

| Number | Name | Date |
|---|---|---|
| 1,002,141 | Fessenden | Aug. 29, 1911 |
| 2,007,076 | Cohen et al. | July 2, 1935 |
| 2,063,610 | Linsell | Dec. 8, 1936 |
| 2,082,347 | Leib et al. | June 1, 1937 |
| 2,204,438 | Neufeld | June 11, 1940 |
| 2,252,083 | Luck | Aug. 12, 1941 |
| 2,361,956 | Moseley | Nov. 7, 1944 |
| 2,365,949 | Greene | Dec. 26, 1944 |
| 2,379,362 | Lear | June 26, 1945 |
| 2,399,671 | Gage | May 7, 1946 |
| 2,400,641 | Hardy | May 21, 1946 |
| 2,403,625 | Wolff et al. | July 9, 1946 |
| 2,419,525 | Alford | Apr. 29, 1947 |

FOREIGN PATENTS

| Number | Country | Date |
|---|---|---|
| 116,666 | Australia | Oct. 10, 1941 |